Sept. 27, 1932. G. BROOMHEAD 1,879,060
TENSION DEVICE FOR AUTOMOBILE TOPS
Filed Dec. 26, 1930
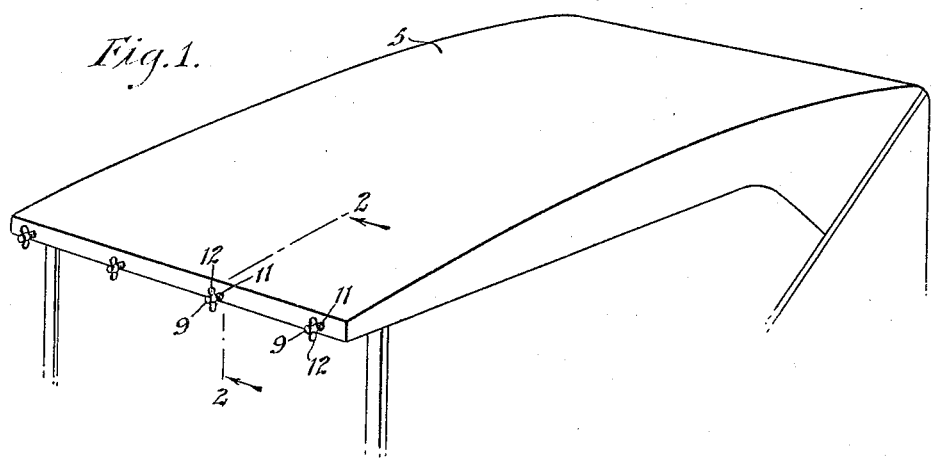
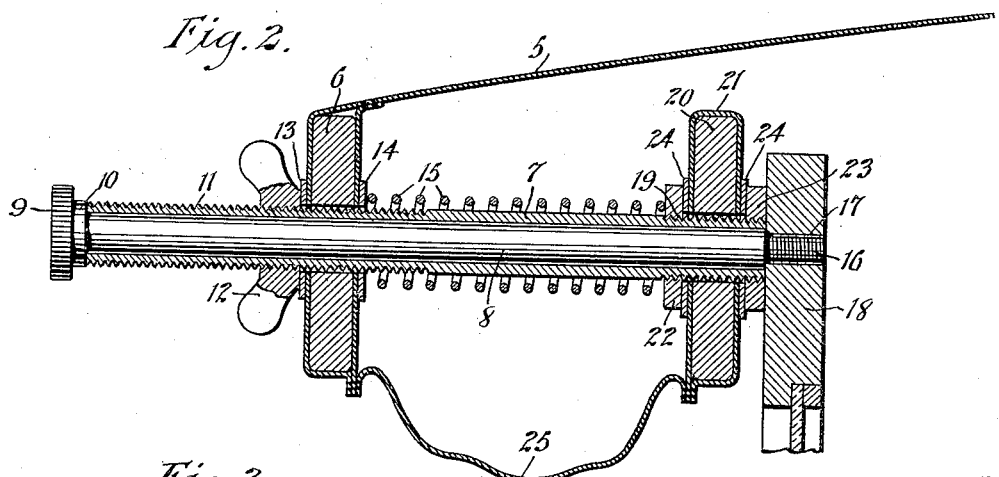
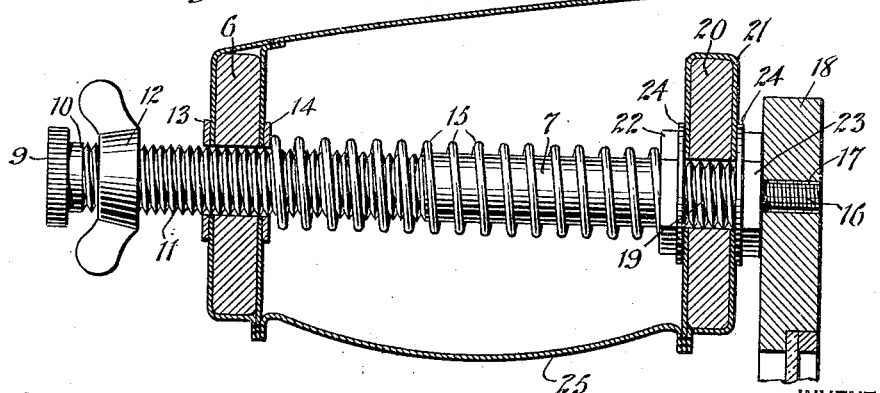
WITNESSES
INVENTOR
George Broomhead
BY
ATTORNEY Patented Sept. 27, 1932

1,879,060

UNITED STATES PATENT OFFICE

GEORGE BROOMHEAD, OF NEW YORK, N. Y.

TENSION DEVICE FOR AUTOMOBILE TOPS

Application filed December 26, 1930. Serial No. 504,934.

An object of the invention is to provide a tension device for automobile tops and similar members having means for holding an automobile top or similar member yieldingly extended.

Another object of the invention is to provide means for moving on a sleeve a member secured to an automobile top, the sleeve being mounted on a stud which has means for securing it to a windshield. Still another object of the invention is to mount a spring on the sleeve, the spring being disposed for holding yieldingly the member which is secured to the automobile top. The invention has as a further object to provide the sleeve with a thread with which meshes a nut for pressing the member secured to the automobile top against the resiliency of the spring.

The invention furthermore comprehends a stud having means for securing it to a windshield, a sleeve with an outer thread being mounted on the stud and a spring being mounted on the sleeve and engaging one side of a member secured to an automobile top for pressing the member yieldingly in one direction, a nut being provided which meshes with a sleeve on the other side of the member for moving the member against the resiliency of the spring. Preferably the stud has a threaded inner end for meshing in a threaded orifice in the windshield, and there is preferably a member having a flexible body which connects the bottom of the first mentioned member with the inner end of the sleeve.

Additional objects of the invention will appear in the following specification in which the preferred form of the invention is described.

In the drawing similar reference characters refer to similar parts in the several views, of which Figure 1 is a fragmentary view illustrating the manner in which the invention is used to hold an automobile top yieldingly extended, Figure 2 is an enlarged sectional view on the line 2—2 of Figure 1, and Figure 3 is a sectional view similar to the view illustrated in Figure 2, but showing the parts in a different position.

While the invention has particular reference to holding an automobile top extended, it will, of course, be understood that it may be employed to hold extended awnings and similar members.

As will be seen by referring to Figure 1 of the drawing, the automobile top 5 is held yieldingly extended at its front by a plurality of similar devices, the structure of the device employed being illustrated in Figures 2 and 3. Secured to the front of the automobile top 5 there is a member 6 which is mounted to slide on sleeves 7, the sleeves 7 being mounted on studs 8 having milled heads 9 with adjacent collars 10, the sleeves 7 being disposed against the collars 10 which serves to limit the outward movement of the sleeves 7 relatively to the studs 8. Each sleeve 7 is threaded at 11 and meshing with this thread 11 there is a wing nut 12, the wing nut 12 serving to engage the member 6, or preferably a washer 13 which is mounted on the sleeve 7 and is disposed against the member 6 or a portion of the automobile top 5 which is disposed around the member 6. At the other side of the member 6 there is disposed a similar washer 14 which is engaged by a spring 15 which is mounted on the sleeve 7 and which serves to press the member 6 yieldingly outwardly in the direction of the milled head 9.

The inner end of each stud 8 is threaded at 16 so that it may mesh in a threaded orifice 17 in a windshield member 18, or in a similar member, it being understood that the stud 8 may be freed from the windshield member 18 by rotating the head 9. Preferably the inner end of the sleeve 7 is threaded at 19 and mounted on this inner end of the sleeve 19 there is a member 20 which is preferably covered with the fabric 21 with which the automobile top is covered, so that it will resemble the automobile top 5 in texture, this member 20 being held in position by nuts 22 and 23 which mesh with the thread 19 on the sleeve 7 and which serve to press washers 24 against the member 20 and its covering 21. The several members 20 are connected with the member 6 by means of a flexible member or fabric 25 which is secured to the portion of the automobile top which passes around the member 6 and which is also secured to the fabric covering 21 which is disposed around the member 20.

It will be understood that by turning the wing nuts 12 the member 6 may be pressed against the resiliency of the spring 15 which is disposed between the washers 14 and the nuts 22 and when this is done the heads 9 may be rotated to free the inner threaded ends 16 of the studs from the windshield 18. The top 5 may then be turned backwardly, as may be desired, together with the studs 8, the sleeves 7 and the members mounted thereon. When the front of the top 5 is to be adjusted at the windshield 18 the top 5 is drawn forwardly and with the several wing nuts 12 turned on the sleeve 7 to compress the springs 15, the studs 8 at their inner threaded ends 16 are turned in the threaded openings 17 in the windshield 18 and when this has been done with reference to the several studs 8, the wing nuts 12 are turned to permit the members 6 to move forwardly under the influence of the spring 15. With the wing nuts disposed as shown in Figure 3 of the drawing, the automobile top 5 will be held forwardly under tension and the flexible member or fabric 25 will serve to enclose the bottom of the sleeves 17 and the springs 15.

What is claimed is:

1. In a tension device, a stud having securing means at its inner end, a sleeve mounted on the stud, means to limit the longitudinal movement of the sleeve relatively to the stud, resilient means on the sleeve for pressing a top member in one direction, and means cooperating with the sleeve for pressing the top member in an opposite direction.

2. In a tension device, a stud having securing means at its inner end, a threaded sleeve mounted on the stud, means to limit the longitudinal movement of the sleeve relatively to the stud, resilient means on the sleeve for pressing a top member in one direction, and a nut meshing with the thread on the sleeve for pressing the top member in the opposite direction.

3. In a tension device, a stud having a thread at one end and a head at its other end, a sleeve mounted on the stud and engaging the head, a resilient means mounted on the sleeve for pressing a top member in one direction, and means for cooperating with the sleeve and the top member for pressing the top member in the opposite direction.

4. In a tension device, a stud having a thread at one end and a head at its other end, a sleeve mounted on the stud and provided with an outer thread, means limiting the longitudinal movement of the sleeve relatively to the stud, a resilient means mounted on the sleeve for pressing a top member in one direction, and a nut meshing with the thread on the sleeve for pressing the top member in the opposite direction.

5. In a tension device, a stud having securing means at its inner end, a threaded sleeve mounted on the stud, means to limit the longitudinal movement of the sleeve relatively to the stud, a top member slidably mounted on the sleeve, resilient means mounted on the sleeve for moving the top member in one direction, and a nut meshing with the thread on the sleeve for moving the top member in the opposite direction.

6. In a tension device, a stud having securing means at its inner end, a threaded sleeve mounted on the stud, means to limit the longitudinal movement of the sleeve relatively to the stud, a top member slidably mounted on the sleeve, resilient means mounted on the sleeve for moving the top member in one direction, a nut meshing with the thread on the sleeve for moving the top member in the opposite direction, and a flexible member secured to the top member and relatively to the inner end of the stud.

7. In a tension device, a stud having securing means at its inner end, a threaded sleeve mounted on the stud, means to limit the longitudinal movement of the sleeve relatively to the stud, a top member slidably mounted on the sleeve, resilient means mounted on the sleeve for moving the top member in one direction, a nut meshing with the thread on the sleeve for moving the top member in the opposite direction, a member secured to the inner end of the sleeve, and a flexible member secured to and connecting the two members.

8. In a tension device, a stud having a thread at its inner end, a threaded sleeve mounted on the stud, means to limit the longitudinal movement of the sleeve relatively to the stud, a member mounted on the stud adjacent its inner end, a top member slidably mounted on the sleeve, a flexible member connecting the two members, a spring mounted on the sleeve between the two members for holding the top member yieldingly in one direction, and a nut meshing with the thread on the sleeve for moving the top member in the opposite direction.

9. In a tension device, a top member having a plurality of openings spaced apart, a plurality of threaded sleeves disposed in the openings respectively, a plurality of studs disposed in the sleeves, the studs having securing means at one set of ends and means to limit the longitudinal movement of the sleeves relatively to the studs, resilient means mounted on the sleeves for holding the top member yieldingly in one direction, and a plurality of screws meshing with the threads on the sleeves respectively for moving the top member in the opposite direction.

10. In a tension device, a top member having a plurality of openings spaced apart, a plurality of threaded sleeves disposed in the openings respectively, a plurality of studs disposed in the sleeves, the studs having securing means at one set of ends and means to limit the longitudinal movement of the sleeves relatively to the studs, a plurality of members mounted on the sleeves adjacent their inner ends, resilient means mounted on the sleeves between the last mentioned members and the top member for holding the top member yieldingly in one direction, a plurality of screws meshing with the threads on the sleeves respectively for moving the top member in the opposite direction, and a flexible member connecting the two members.

11. In a tension device, a stud having a thread at its inner end for meshing with a thread at the front of a windshield, with the stud extending forwardly of the windshield, the stud having a collar on its forward end, a sleeve mounted on the stud and engaging the collar and the windshield, the sleeve having an outer thread, a top member having means with an opening through which the sleeve is disposed, a spring mounted on the sleeve between the said means and the windshield, and a nut mounted on the thread of the sleeve between the said means and the collar.

Signed at New York city, in the county of New York and State of New York this 18th day of December, 1930 A. D.

GEORGE BROOMHEAD.